Patented Aug. 5, 1941

2,251,869

UNITED STATES PATENT OFFICE 2,251,869

PIGMENT

David L. Gamble and James H. Haslam, Palmerton, Pa., assignors to The New Jersey Zinc Company, New York, N. Y., a corporation of New Jersey No Drawing. Application April 6, 1939,
Serial No. 266,410

16 Claims. (Cl. 134—78)

This invention relates to pigments, particularly zinc oxide pigments and contemplates an improved zinc oxide pigment in which the inherent superior optical properties of zinc oxide such as whiteness, opacity to ultra-violet light, etc., are coupled with a high resistance to staining and with decreased reactivity with acid vehicles. The invention also contemplates a method of treating zinc oxide to produce the improved pigment and a stable paint in which zinc oxide pigment is contained in a vehicle having acid components such as free fatty and resin acids.

As a pigment, zinc oxide offers numerous advantages. It has good optical properties, in particular a high absorbing power for ultra-violet light. Moreover, zinc oxide is of superior whiteness and possesses high hiding power and a strong resistance to mildew. But, because of its basic character it tends to react with acidic constituents of paint vehicles. This tendency when uncontrolled creates difficulties with certain vehicles. In particular, heretofore customary zinc oxide causes difficulties when it is incorporated in the so-called resin-emulsion vehicles which are used in the manufacture of pigmented coatings for the painting of both interior and exterior surfaces. A common type of these vehicles comprises an alkyd type synthetic resin emulsified in water. Ordinarily, attempts to incorporate an appreciable proportion of zinc oxide into this type of vehicle results in an immediate breaking of the emulsion. And, even when it is found possible to temporarily incorporate zinc oxide, the resulting paint is unstable.

Another property of zinc oxide that sometimes creates difficulties when it is used as a pigment is its ability to catalyze a photochemical reaction whereby the salts of certain metals are converted to oxides. Thus, under certain conditions of exposure, a paint film containing heretofore customary zinc oxide pigment will develop a brownish-black stain if brought into contact with copper-bearing water. This type of staining of the zinc oxide by the copper is due to the adsorption of copper salts and to a subsequent photo-chemical conversion of these copper salts to black copper oxide, this conversion being catalyzed by the zinc oxide. Discoloration of zinc oxide paint films underneath windows covered with copper screen often is the result of the above-described reaction.

As a result of our investigations, we have found that zinc oxide pigment particles coated with a relatively thin layer of a zinc phosphate retain the valuable pigmentary properties inherent to zinc oxide, but have a high resistance to staining by copper salts and the like. Moreover, the zinc phosphate layer controls or inhibits reaction of the zinc oxide with highly acidic or otherwise reactive vehicles. In accordance with our invention, the individual particles of zinc oxide are coated with a zinc phosphate in a layer not thick enough substantially to affect deleteriously the physical or optical properties of the pigment, but sufficiently thick and impermeable to control or inhibit chemical reaction of the zinc oxide with acids in paint vehicles and hinder its catalytic effect upon the photo-chemical conversion of copper salts and the like. To produce an effective coating of a zinc phosphate upon the individual particles of zinc oxide, the zinc phosphate must be formed by a molecular reaction as distinguished from an ionic reaction with the zinc oxide. If the zinc phosphate is formed on the zinc oxide at the surface of a particle by ionic reaction, we have found that it tends to grow as crystals, either separate from the zinc oxide particles or in contact with only part of the surface instead of coating the surface. Thus, a relatively large proportion of zinc oxide can be transformed to zinc phosphate by ionic reaction without adequately covering the surface of the zinc oxide particles. As much as three-quarters of the zinc oxide may be phosphated in this fashion without rendering the remaining zinc oxide resistant to attack by reactive vehicles or salts of metals such as copper. Zinc phosphates do not of themselves have good pigmentary properties, so that the conversion of a large proportion of the zinc oxide to zinc phosphate results in a pigment which, albeit somewhat more resistant than ordinary zinc oxide to reaction with vehicles and to discoloration, has poor hiding power and is deficient in other desirable properties of pigments.

On the other hand, we have discovered that phosphoric acids and phosphates will produce a substantially uniform and impervious coating on zinc oxide particles if brought into contact with the zinc oxide particles under such conditions that a zinc phosphate is formed by molecular reaction. Zinc oxide pigment may be given such a desirable coating by treating it in aqueous suspension with aqueous solutions of pyrophosphoric acid or metaphosphoric acid, or the sodium, potassium or ammonium salts of these acids; or by treating it in ethyl alcohol suspension with solutions of orthophosphoric acid, pyrophosphoric acid, or metaphosphoric acid or the sodium, potassium or ammonium salts of these acids. Other phosphoric acids such as phosphotungstic or phosphomolybdic acid may also be used in the practice of the invention under conditions in which they react molecularly with the zinc oxide.

Our invention, therefore, contemplates the formation of a surface coating (as distinguished from separate particles or attached crystalline growths) of a zinc phosphate on zinc oxide particles by a molecular reaction involving the zinc oxide and a phosphoric acid or phosphate. The production of such a surface coating is facilitated if the phosphate compound or phosphoric acid used tends to be adsorbed at the surface of the zinc oxide particles, with consequent initial dispersion of the particles. A phosphate or phosphoric acid which promotes dispersion of a suspension of zinc oxide particles in a given liquid is, therefore, a desirable reagent for producing the desired zinc phosphate coating. Hence, the dispersion effect of a phosphate or phosphoric acid on a zinc oxide suspension is a reliable index of results to be expected.

The coating layer of a zinc phosphate should be no thicker than is necessary to protect the zinc oxide to the desired extent. Excessively thick coatings do not give optimum pigmentary properties per unit of zinc present, because the formation of the zinc phosphate involves the consumption of zinc oxide which has the better optical properties. However, measurements conducted with pigments treated in accordance with our invention show that the treatment with 5% of the phosphatizing reagent (on the weight of the pigment) has no measureable effect upon hiding power while in case of treatment with 10% of said reagent, hiding power is only slightly reduced.

Treatment of zinc oxide particles in accordance with our invention thus results not only in a degree of non-reactivity as high as is desired or necessary with acid vehicles and as high resistance to staining as described hereinbefore, but also in marked improvement in such paint film properties as tint retention, color and cleansing properties, and durability. Moreover, these improvements are obtained without seriously affecting the other properties of the zinc oxide. For example, the pigment of our invention retains the high ultra-violet light absorbing power and the good mildew resistance of heretofore customary types of zinc oxide pigments.

To consider the presently preferred practice of the invention in greater detail, the zinc oxide is placed in water or ethyl alcohol and brought into suspension by mechanical agitation. A solution of the phosphoric acid or phosphate being used is then added with sufficient agitation to insure rapid and thorough distribution of the acid or phosphate through the pigment suspension. Agitation may be continued until reaction of the phosphate compound or acid with the zinc oxide particles ceases. At first, the acid or phosphate causes further dispersion of zinc oxide particles, but at the end point of the reaction, the suspension becomes flocculated and settles rapidly. The treated slurry is then filtered, dried and disintegrated in the usual way.

All of the acid or phosphate compound added to the suspension does not react with the pigment when the treatment is properly carried out. The zinc phosphate coating formed about the particles acts as a barrier to the attack of the zinc oxide and so stops the reaction. The use of a substantial excess of acid or phosphate compound should be avoided, however. The course of the reaction may be followed by pH measurements. When a substantially constant pH value in the liquid portion of the slurry is attained, the reaction should be stopped. Otherwise, the thickness of the coating may be greater than optimum.

When the treatment is carried out in alcohol suspensions, ortho ($H_3PO_4$); pyro ($H_4P_2O_7$); and meta ($HPO_3$) $x$ phosphoric acids are all effective for the purpose of the invention, their effectiveness increasing with decreasing solubility of the corresponding zinc salts in water, which is in the order named. Ethyl alcohol used to form the suspensions should be at least 90% alcohol, and preferably 95%. The phosphoric acid or phosphate employed may be added to the ethyl alcohol in the form of a highly concentrated aqueous solution in order to further its rapid and thorough incorporation provided that care is taken not to dilute the alcohol with more than 10% of water. Thus, orthophosphoric acid may be added to the ethyl alcohol in the form of a highly concentrated solution containing only 15% by weight of water and 85% orthophosphoric acid.

When the treatment is carried out in water suspension, which is preferable from a commercial standpoint, orthophosphoric acid is ineffective. Its use results in only a slight improvement in the resistance of zinc oxide to metallic staining, and reactivity of the zinc oxide with acid vehicles is not appreciably reduced. On the other hand, in aqueous suspension pyro and meta acids and their aforementioned salts are found to be highly effective for the purpose of the invention.

Acids such as triphosphoric or tetraphosphoric acids (which generally are believed to be mixtures of ortho, pyro and meta acids in various proportions) may be used for the purpose of the invention, those lowest in ortho acid and highest in meta being the most effective, especially when treatment is carried out in an aqueous slurry or suspension. The sodium, potassium and ammonium salts of the pyro, meta or mixed acids low in ortho acid may be used, but have been found, in general, to be less effective than the corresponding acids. The sodium or potassium salts have a further disadvantage in that the hydroxide generated by their reaction must be removed from the pigment by thorough washing. In the case of the acids, water is the only product of reaction other than the zinc phosphate. As indicated hereinbefore, phosphotungstic and phosphomolybdic acids are also effective, and the term "phosphoric acid" is used herein to include these compounds.

In carrying out the practice of the invention, only fresh solutions of the pyro-, meta- or mixed acids or their salts should be used, particularly when the zinc oxide is treated in aqueous suspension. This is because both pyro- and meta-acids or their salts upon standing in solution tend to revert to the ortho-compound, which is not suitable for the practice of the invention when treatment is made in a water slurry and is less desirable than the other forms even when the zinc oxide is treated in non-aqueous suspension.

The quantity of phosphatizing reagent employed in the treatment with a view toward realizing maximum reduction in reactivity and greatest improvement in other properties of the pigment will depend both upon the particular reagent and the particle size of the zinc oxide being treated. Generally speaking, not more than 15% of the reagent on the weight of the zinc oxide pigment will be needed, even when the pigment is very finely divided and hence has a large surface area per unit of volume. In treating a given zinc oxide, less of the meta acid than the pyro is needed to obtain optimum results. In the case of an oxide having a particle diameter of about 0.5 micron, 5% of the pyro acid, on the basis of the weight of the pigment, may be needed in order to insure optimum results, although the same results may be obtained with only 3% of the meta acid. With extremely fine particle size zinc oxide (average diameter 0.1-0.2 micron), as much as 10% of the acid (on the basis of the weight of the zinc oxide) may be needed. With coarse particles of zinc oxide (average diameter 1 micron or greater) 1% or less of the acid may be all that is required.

In some cases, a certain amount of reaction between pigment and vehicle may be desirable and the amount of phosphatizing reagent employed may be adjusted to yield a pigment having the proper degree of reactivity. Accordingly, treatment in accordance with our invention may be employed to control reactivity of zinc oxide pigments.

In treating a given zinc oxide for the maximum reduction in reactivity with either the pyro or meta acids, care should be taken not to use a substantial excess of acid over and above that amount which will completely coat the pigment and yield a product having the lowest obtainable degree of reactivity. Use of such an excess will leave a considerable proportion of unreacted phosphoric acid associated with the pigment and this may affect adversely the drying properties and general film forming characteristics of paints prepared from the treated pigment in certain vehicles.

It is generally necessary or desirable to coat the zinc oxide pigment prior to its incorporation into the paint vehicle with which it is to be used. Nevertheless, in the case of certain vehicles of the water emulsion type, it is possible to form a zinc phosphate coating in accordance with the invention on the zinc oxide particles while in suspension in the water emulsion vehicle, by treatment with a phosphatizing reagent. Under most circumstances however, there is nothing to be gained by treating the pigment after incorporation in the vehicle rather than before, and with reactive vehicles, especially those of the resin emulsion type, there is danger of damage to the vehicle by the uncoated zinc oxide.

We describe hereinafter the practice of our invention with a normal paint grade of zinc oxide and commercial meta-phosphoric acid with a view to obtaining maximum reduction in reactivity of the zinc oxide. In the example, the oxide being treated has an average particle diameter of 0.4-0.5 micron. The commercial grade of metaphosphoric acid used as treating agent contains about 10% pyrophosphoric acid and analyzes 85 to 88% $P_2O_5$.

100 lbs. of zinc oxide is pulped in 80 gallons of water contained in a 100 gallon tank fitted with a suitable agitator to produce a slurry which contains 15% pigment by weight and is sufficiently fluid to permit easy handling and rapid and uniform mixing. Before addition of the phosphatizing reagent, a high degree of dispersion of the zinc oxide is obtained by mechanical agitation, for example by recirculating the slurry through a colloid mill. As soon as a high degree of dispersion has been obtained, recirculation through the colloid mill is discontinued and a freshly prepared solution of the metaphosphoric acid (made by dissolving three pounds of the metaphosphoric acid in two to three gallons of water) is stirred into the slurry in the tank with the agitator provided for that purpose. Before addition of the acid, the zinc oxide slurry has a pH value in the neighborhood of 6.78, although this value will vary in practice according to the particular zinc oxide and water used. Immediately upon addition of the acid solution, the pH value of the slurry drops to 4.5. Thereafter, upon continuing agitation, the pH of the slurry rises gradually to a constant value of 5.8-6.0. When the pH value becomes substantially constant, the formation of the zinc phosphate surface coating on the zinc oxide particles is complete. Approximately one hour is required after the addition of the acid solution for the reaction to reach this end point. After the end point is reached, the slurry is filtered and the pigment dried and disintegrated in the ordinary way. The finished pigment analyzes approximately 2.3-2.4% $P_2O_5$.

*Nature of the zinc phosphate deposited on the pigment particles*

That the hereinbefore described treatment results in the production of a true surface coating on the individual zinc oxide particles is indicated not only by the reduction in chemical activity and increase in resistance to metallic staining, but has also been demonstrated by electron diffraction examination and ultra-violet photomicrography.

Examination of the product by electron diffraction demonstrates that a uniform surface coating is obtained upon the individual zinc oxide particles. When a 40,000 volt electron beam is used, with a thickness of coating of zinc pyro- or metaphosphate which should just prevent the penetration of the electron beam into the zinc oxide particles, no zinc oxide pattern is obtained, the zinc phosphate protecting the zinc oxide from the electron beam. However, as the thickness of coating is reduced, the zinc oxide pattern begins to show up, but at a considerably reduced intensity in comparison with the untreated zinc oxide. That mere phosphation of zinc oxide by ionic reaction does not result in a uniform surface coating, is shown by the fact that when zinc oxide treated with as high as 10% ortho phosphoric acid in water suspension is examined, the electron diffraction pattern of zinc oxide is obtained with an intensity essentially equal to that found when untreated zinc oxide is examined.

Zinc phosphates are highly transparent to ultra-violet light; zinc oxide is highly opaque to ultra-violet light; the two can thus be distinguished in ultra-violet photo-micrography, and the character of the zinc phosphate content in the product of the examination may be investigated. Thus, zinc oxide treated with several percent of pyro- or metaphosphoric acid in a water slurry and photographed after appropriate finishing treatment with the 2750 Å. ultra-violet line of the cadmium spark, exhibits few if any, transparent particles of zinc phosphate. However, when the same oxide treated in the same way with corresponding amounts of orthophosphoric acid is photographed with the 2750 Å. ultra-violet line of a cadmium spark, it is found that a relatively large number of highly transparent zinc phosphate crystals existing as independent particles are associated with the opaque zinc oxide particles. Ultra-violet photomicrography thus evidences that in the product of the invention, a large proportion of the zinc phosphates formed is intimately associated with the surfaces of the zinc oxide particles.

Reactivity

Reactivity of a zinc oxide pigment may be investigated by bringing it into contact with fatty acids and observing the development of zinc soaps. Thus, when ordinary zinc oxide is dispersed in fatty acids of linseed oil and observed on a polarizing microscope, a gradual development of soap crystals is seen as the individual particles react with the fatty acids. Untreated zinc oxide examined in this manner exhibits an appreciable soap formation within a half hour or so. On the other hand, zinc oxide having its particles sufficiently coated with a zinc phosphate in accordance with our invention, may be permitted to stand overnight in 100% fatty acids before any soap formation at all is detected, and then such formation is limited in quantity.

Reactivity of zinc oxide with the acidic constituents of oleoresinous vehicles may be measured by determining its rate of reaction with linseed oil fatty acids in an ethyl alcohol solution. The pigment being tested is suspended in a solution of linseed oil fatty acids in ethyl alcohol of known concentration and the rate of reaction of the zinc oxide with the fatty acids is determined by measuring the refractive index of the solution at regular intervals. As the fatty acid is removed from solution by reaction of the zinc oxide to form soap, the refractive index of the solution diminishes so that the concentration of unreacted fatty acids can be determined at any time. The following tabulation gives a comparison of the relative reactivities of an untreated zinc oxide pigment and the same material treated with 1½% on the weight of the pigment of ortho-, pyro-, and metaphosphoric acids, respectively, in water slurries, the measurements having been made by the above-described method. Reactivity is expressed in terms of the percent of the original concentration of the fatty acid remaining in solution after contact with the pigment for one and a half hours.

| Pigment | Percent of original concentration of fatty acids remaining after 1½ hours' contact with pigment |
| --- | --- |
| Original untreated zinc oxide | 45.5 |
| Same treated with 1½% orthophosphoric acid in water | 52.9 |
| Same treated with 1½% pyrophosphoric acid in water | 84.6 |
| Same treated with 1½% metaphosphoric acid in water | 92.6 |

A third method of measuring reactivity of zinc oxide pigments to vehicles consists in determining the rate of heat evolution generated by the aforementioned soap reaction when the pigment is brought in contact with linseed fatty acid. Within a suitable calorimeter, the pigment to be tested is dispersed in a concenrated solution of linseed fatty acids in a petroleum solvent, the rate of reaction being measured by noting the temperature rise with time. In the following table are given the results of reactivity tests made in this way on a series of pigments consisting of a given zinc oxide treated in water with varying amounts of metaphosphoric acid.

| Pigment | Total temperature rise (0° C.) after 40 minutes |
| --- | --- |
| Original untreated zinc oxide | [1] 10.6 |
| Same treated with 1½% meta acid | 1.2 |
| Same treated with 3% meta acid | 0.5 |
| Same treated with 5% meta acid | 0.5 |

[1] Reaction complete.

As indicated above, a maximum reduction in reactivity of this particular zinc oxide was obtained by treatment with 3% of metaphosphoric acid.

Because of its low reactivity, the phosphate-coated zinc oxide pigment of our invention may be incorporated in large proportion in various vehicles which are intensely reactive to ordinary zinc oxides. Thus, the zinc oxide pigment of our invention may be incorporated in large proportion into a vehicle consisting of an alkyd type synthetic resin emulsified in water, with resulting production of a satisfactory stable paint. Paints made with such vehicles and in which 50% of the total pigmentation consists of the treated oxide are in as satisfactory a condition after several months of shelf-aging as are paints prepared from the same vehicles with such nonreactive pigments as titanium dioxide and zinc sulphide. On the other hand, attempts to introduce 25 to 30% (of the total pigmentation) of ordinary zinc oxide into such vehicles results in immediate granulation and breakdown of the alkyd resin emulsion.

Heretofore customary forms of zinc oxide pigment promote livering of paints containing reactive vehicles, particularly those containing free fatty acids in the following two distinct ways: (1) by reacting with the acid constituents of the vehicles to form insoluble zinc soaps that jell in the vehicle and (2) by removing from the vehicles the acidic materials that normally act as peptizing agents for polymerized oils or resins, so that these latter constituents likewise have opportunity to jell. In contrast, the phosphate coating on the product of our invention inhibits livering brought about in either of the foregoing ways by preventing (1) the formation of zinc soaps and (2) the removal of peptizing agents. Disturbing alteration in the original properties of reactive vehicles is thus prevented, and our invention contemplates a paint of improved stability in which zinc oxide particles coated with a relatively small proportion of a zinc phosphate are contained in a vehicle having substantial proportions of such otherwise reactive components as free fatty and resin acids.

Staining

Under certain conditions of exposure, a brownish-black staining results when a paint film containing ordinary zinc oxide is brought into contact with copper-bearing water. The staining of the zinc oxide by the copper is due to the adsorption of copper salts which at first results in a light blue discoloration. Upon subsequent exposure to ultra-violet light, the zinc oxide catalyzes a photo-chemical conversion of the copper salts to the black copper oxide which results in the unsightly staining. The phosphate-coated zinc oxide pigment of our invention, however, does not develop a black stain when exposed to copper salts in the presence of light, probably because the phosphate coating acts to inhibit the catalytic action of the zinc oxide. Whatever be the explanation, the zinc oxide product of our invention is quite as resistant to staining as are lead pigments and titanium dioxide. Treatment of zinc oxide with metaphosphoric acid in the hereinbefore described manner has been found the most effective from the standpoint of improved stain resistance. Treatment of zinc oxide with orthophosphoric acid has been found only slightly effective except when the treatment of the zinc oxide is carried out in a non-aqueous suspension.

*Tint retention*

Zinc oxide is one of the best pigments for imparting good tint-retaining properties to exteriorly exposed films of tinted house paints or enamels. This property of zinc oxide is, however, enhanced by treatment in accordance with our invention. Here again, treatment with the metaphosphoric acid in amounts to just yield the maximum reduction in reactivity has been found most effective from the standpoint of inhibiting the fading of tinted paints.

The superiority of the product of the invention is demonstrated by comparative tests in which two paints were prepared from a raw linseed oil paint vehicle, of the type adapted to outside exposure, one pigmented with untreated zinc oxide and the other pigmented with the same oxide treated, in accordance with the invention, with 5% of pyrophosphoric acid. The two paints were tinted as nearly as possible to the same shade of grey with carbon black and panels coated with the grey paints were placed in an accelerated weathering apparatus which subjected the panels to exposure to water spray and intense ultraviolet light.

Before and at regular intervals during the exposure, the brightnesses of the panels were determined and compared by means of a photoelectric reflectometer with the following results.

| Pigment | Initial brightness, in per cent of $MgCO_3$ standard | Increase in brightness due to accelerated exposure of days— | | | | |
|---|---|---|---|---|---|---|
| | | 4 | 8 | 11 | 15 | 18 |
| Original untreated zinc oxide | 22.9 | 5.3 | 7.7 | 10.4 | 10.9 | 11.8 |
| Same treated with 5% pyrophosphoric acid | 22.6 | 2.8 | 4.5 | 6.6 | 6.4 | 7.4 |

The phosphate-coated zinc oxide pigment of the invention, as shown by the smaller increase in brightness of the paint film pigmented with this material, exhibits less tendency to fade than does the untreated zinc oxide.

*Film color and cleansing properties*

Exposure tests have shown that when a zinc oxide treated in accordance with the invention is substituted for the same untreated zinc oxide in an untinted house paint or exterior enamel, the resulting film exhibits less tendency to retain dirt and the film itself maintains its original brightness and whiteness for a longer period of time.

*Durability*

Zinc oxide is widely used in exterior paints, enamels and lacquers because of the desirable properties it imparts to the films. Its use in suitable quantities results in greatly improved appearance as evidenced by improved gloss and gloss retention, by reduced dirt retention, by the absence of mildew, and by cleaner and clearer tints which do not fade on exposure. The advantages to be gained from the use of zinc oxide are proportional to its concentration in the film. The amounts of zinc oxide, however, which may be used safely in the formulation of exterior coatings are limited by the tendency of zinc oxide to react with the acidic constituents of the vehicles and to harden the resultant films. The use of zinc oxide with reactive vehicles or of excessive amounts of zinc oxide with ordinary vehicles may entail failure by severe cracking and scaling, a form of failure which is particularly undesirable because of the difficulties encountered in repainting. When employing heretofore customary types of zinc oxide, the paint formulator, therefore, is forced to strike a compromise and sacrifice some of the desirable appearance characteristics imparted by the incorporation of high concentrations of zinc oxide for improved durability characteristics obtained under certain conditions with lower zinc oxide concentrations. Paint manufacturers have therefore been desirous of securing a zinc oxide which could be used in large enough concentrations to insure satisfactory appearance characteristics without sacrifice in durability.

Exterior and accelerated exposure tests have shown that zinc oxide pigment prepared in accordance with this invention possesses these desirable characteristics. In such zinc oxide, the tendency to cause film failure by excessive cracking and scaling is greatly reduced. Paints containing this improved zinc oxide not only begin to show failure much later than similar paints made with ordinary zinc oxide but also fail much less severely. The use of this improved zinc oxide therefore enables the paint manufacturer to obtain optimum appearance properties and tint retention without sacrifice in durability characteristics.

The improved zinc oxide pigments of the invention may be manufactured pyrometallurgically by intimately contacting dry and heated particles of zinc oxide with a phosphorous compound capable of transforming the surfaces of a large part of the zinc oxide particles to a zinc phosphate, as described and claimed in our copending application Ser. No. 267,322, filed April 11, 1937.

We claim:

1. In the manufacture of zinc oxide pigment, the improvement which comprises forming a coating of a zinc phosphate on particles of the zinc oxide in the presence of water by a reaction between the zinc oxide and a substance selected from the group consisting of meta- and pyrophosphoric acids and the sodium, potassium and ammonium salts thereof.

2. In the manufacture of zinc oxide pigment, the improvement which comprises forming a surface coating of a zinc phosphate on particles of the zinc oxide suspended in an aqueous slurry by incorporating into the aqueous slurry a compound selected from the group consisting of meta- and pyrophosphoric acids, and the sodium, potassium and ammonium salts thereof.

3. In the manufacture of zinc oxide pigment, the improvement which comprises forming a surface coating of zinc phosphate upon particles of the zinc oxide suspended in an aqueous slurry by incorporating into the aqueous slurry an aqueous solution of a compound selected from the group consisting of meta- and pyrophosphoric acids and the sodium, potassium and ammonium salts thereof.

4. In the manufacture of zinc oxide pigment, the improvement which comprises forming a surface coating of a zinc phosphate upon particles of the zinc oxide suspended in an aqueous slurry by incorporating into the slurry a compound selected from the group consisting of meta- and pyrophosphoric acids and the sodium, potassium and ammonium salts thereof and agitating the slurry until a substantially constant pH is attained therein.

5. In the manufacture of zinc oxide pigment, the improvement which comprises forming a zinc phosphate coating on the surface of zinc oxide particles by a reaction between the zinc oxide particles in aqueous suspension and a dissolved substance selected from the group consisting of meta- and pyrophosphoric acids and the sodium, potassium and ammonium salts thereof, agitating the aqueous suspension during the reaction, determining the pH of the aqueous component of the suspension periodically during the reaction and stopping the reaction when a predetermined pH value has been attained, whereby the reactivity of the zinc oxide pigment is controlled.

6. In the manufacture of zinc oxide pigment, the improvement which comprises forming a surface coating of zinc phosphate on the particles of zinc oxide in an aqueous slurry by a reaction between the zinc oxide and a dissolved substance selected from the group consisting of meta- and pyrophosphoric acids and the sodium, potassium and ammonium salts thereof, and agitating the slurry in the presence of the substance until the slurry becomes flocculated.

7. In the manufacture of zinc oxide pigment, the improvement which comprises forming a zinc phosphate coating on the surface of zinc oxide particles by a molecular reaction between the zinc oxide suspended in aqueous slurry and a dissolved substance selected from the group consisting of meta- and pyrophosphoric acids and the sodium, potassium and ammonium salts thereof, and thereafter removing the unreacted portion of said substance from the zinc oxide.

8. In the manufacture of zinc oxide pigment, the improvement which comprises forming a surface coating of a zinc phosphate on the surface of particles of the zinc oxide by reacting the zinc oxide in ethyl alcohol suspension with a substance selected from the group consisting of ortho-, meta- and pyrophosphoric acids and the sodium, potassium, and ammonium salts thereof.

9. In the manufacture of zinc oxide pigment, the improvement which comprises forming a zinc phosphate coating on the surface of particles of the zinc oxide suspended in ethyl alcohol, said ethyl alcohol being diluted with not more than 10% of water, by a reaction between the zinc oxide and a dissolved substance selected from the group consisting of ortho-, meta-, and pyrophosphoric acids and the sodium, potassium and ammonium salts thereof.

10. In the manufacture of zinc oxide pigment, the improvement which comprises forming a zinc phosphate coating on the surface of particles of the zinc oxide by incorporating into an ethyl alcohol suspension of the zinc oxide particles an aqueous solution of a compound selected from the group consisting of ortho-, meta-, and pyrophosphoric acids and the sodium, potassium and ammonium salts thereof, the amount of water introduced into the suspension being not more than 10% of the weight of the ethyl alcohol present.

11. An improved pigment comprising particles of zinc oxide surface-coated with a zinc phosphate.

12. An improved zinc oxide pigment having reduced reactivity and high resistance to metallic staining comprising particles of zinc oxide surface-coated with a substantially uniform layer of a zinc phosphate.

13. A zinc oxide pigment of reduced reactivity and improved resistance to metallic staining, which comprises zinc oxide particles surface-coated with a zinc phosphate in substantial amount but not to exceed about 15% by weight of the pigment.

14. A zinc oxide pigment which comprises particles of zinc oxide coated with a relatively thin and substantially impervious layer of a zinc phosphate.

15. A zinc oxide pigment comprising particles of zinc oxide coated with a relatively thin, uniform, and substantially impervious layer of a zinc phosphate, said layer being substantially unreactive to fatty acids.

16. In the manufacture of zinc oxide pigment, the improvement which comprises forming a zinc phosphate coating on the surface of zinc oxide particles in the presence of a liquid selected from the group consisting of water and ethyl alcohol by reaction between the zinc oxide and a compound that is soluble in the liquid and tends to bring about dispersion of the zinc oxide particles therein, said compound being selected from the group consisting of meta- and pyrophosphoric acids and the sodium, potassium and ammonium salts thereof.

DAVID L. GAMBLE.
JAMES H. HASLAM.